May 31, 1960 F. A. DEUTSCH 2,938,667
COMBINATION CARD FEED AND SENSING MEANS
Filed Jan. 25, 1957 8 Sheets-Sheet 1

INVENTOR
FRITZ A. DEUTSCH
BY
AGENT

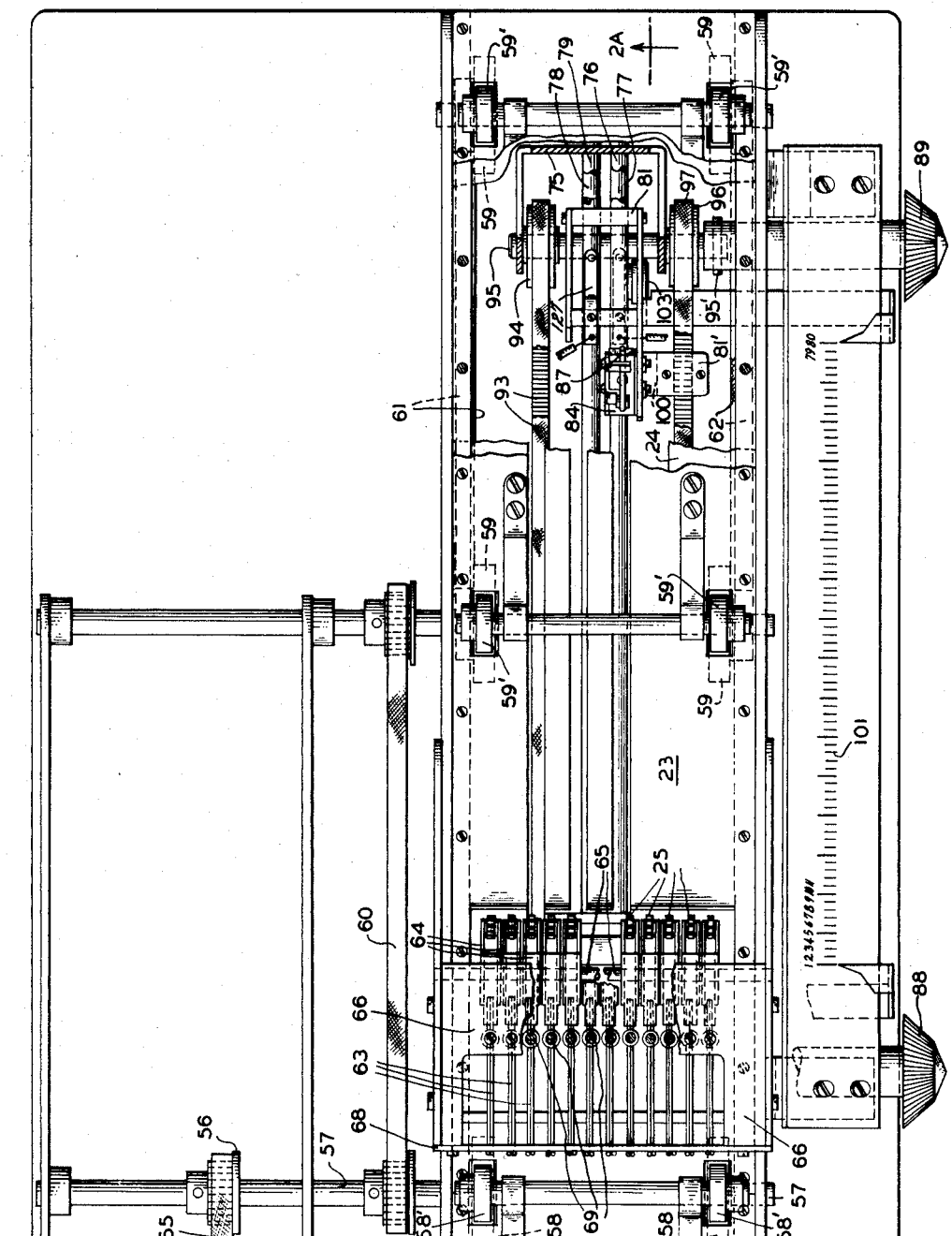

May 31, 1960    F. A. DEUTSCH    2,938,667
COMBINATION CARD FEED AND SENSING MEANS
Filed Jan. 25, 1957    8 Sheets-Sheet 3

INVENTOR
FRITZ A. DEUTSCH
BY
AGENT

May 31, 1960 F. A. DEUTSCH 2,938,667
COMBINATION CARD FEED AND SENSING MEANS
Filed Jan. 25, 1957 8 Sheets-Sheet 4

INVENTOR
FRITZ A. DEUTSCH
BY Elmer W. Edwards
AGENT

May 31, 1960  F. A. DEUTSCH  2,938,667
COMBINATION CARD FEED AND SENSING MEANS
Filed Jan. 25, 1957  8 Sheets-Sheet 5

INVENTOR.
FRITZ A. DEUTSCH
BY
AGENT

INVENTOR.
FRITZ A. DEUTSCH
BY Edna W. Edwards
AGENT

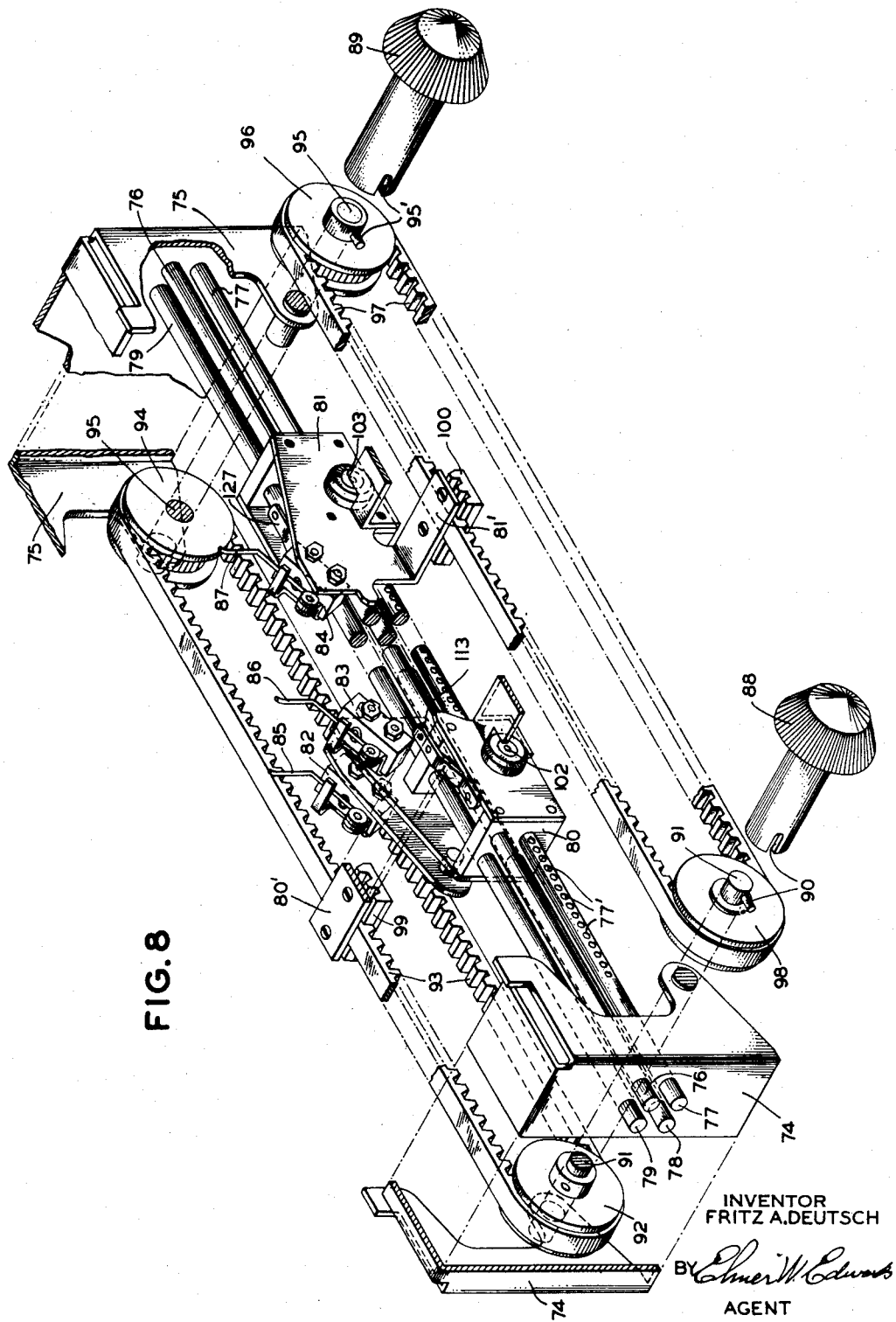

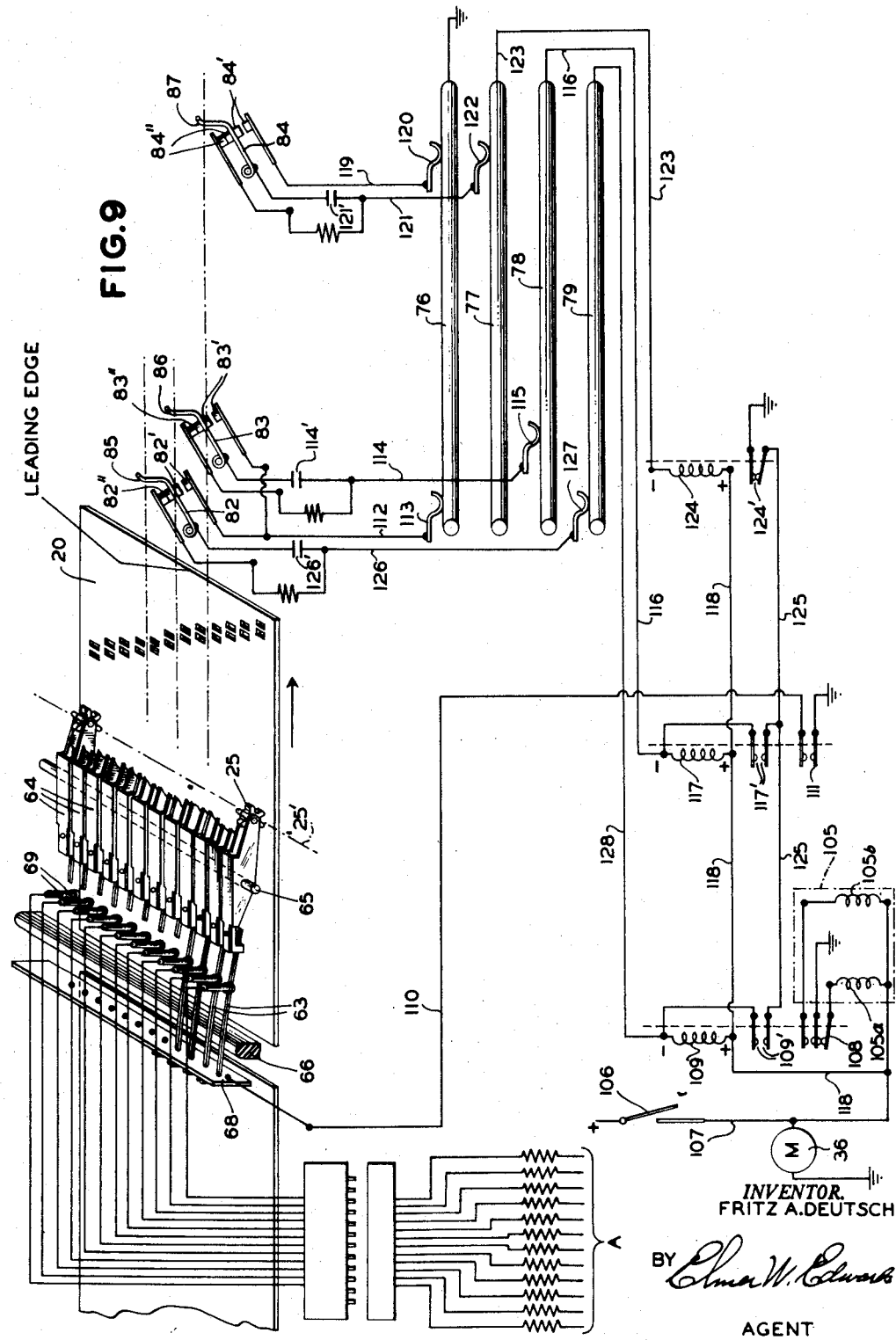

United States Patent Office 2,938,667
Patented May 31, 1960

2,938,667

COMBINATION CARD FEED AND SENSING MEANS

Fritz A. Deutsch, East Orange, N.J., assignor to Monroe Calculating Machine Company, Orange, N.J., a corporation of Delaware Filed Jan. 25, 1957, Ser. No. 636,357

28 Claims. (Cl. 235—61.11)

The instant invention relates to record card feeding-card sensing devices of the type employed in connection with the control of tabulating machine or the like, and more particularly to control means therefor which are presettable for selectively predetermining a particular portion or field of a record card within which the sensing devices shall be active for effecting electrical impulse signals in accordance with data designations appearing thereon, and including means whereby the record cards are fed at a reduced speed during such sensing operations.

Data to be analyzed by the sensing devices usually appear as perforations effected in succesive vertical columns of a punched record card provided with data index positions located in horizontal rows and vertical columns, the data being represented in columns of the record card in accordance with a chosen code. While the record cards may contain any desired number of record columns one complete card of well-known type is included herein containing 80 colunms which may be divided selectively into a plurality of fields each employing one or more record columns as desired. Numerals are usually represented upon the card in the single point code, by selectively perforating 0, 1, 2–9 index positions of a column; alphabetic data are usually represented in the combinational index code, by selective combinations of perforations in index positions 1, 2–9 and index positions 0, 11 and 12.

Apparatus of the above type usually comprises a magazine within which the record cards are stacked and a picker device or other suitable card conveyor means which act to feed the cards singly from the bottom of the stack. The cards are thereafter conveyed along suitable guided means to pass a sensing station which may comprise a line of individual contact elements one for each of the indicia recording horizontal rows of the card. At this sensing station, perforations in the record card heretofore either operate such contact elements directly or employ suitable star wheels which cause opening and closing of individual related contact members for effecting electric circuits utilized to control various accumulating, printing and other related mechanisms. Where a series of closely spaced perforations appear upon a record card, however, the star wheels rotate continuously in accordance therewith and heretofore such operation would act to maintain a continuous circuit. Therefore, to effect an electrical impulse for each of said perforations separate pulsing means have heretofore been provided operable in timed relation with the record card movement.

In many forms of card-controlled machine operations it is often desired that only particular items of data as appear within a certain field or portion of a card which is common to a plurality of the cards are to be entered in the machine throughout the card run operation. For example, when a card-controlled tabulator is set and used for posting customers' bills, items common to a plurality of cards would be the date of the bill, a standard fixed service charge, or a similar item any one of which items remains constant for each customer, and for which corresponding perforations have been effected in each card in an appropriate field thereof reserved for that purpose. Items within the related fields or portions of the cards are not however limited to corresponding fixed amounts but may vary relative to each card.

One object of the present invention is to provide a manually settable control means adapted for selectively predetermining a particular field on a record card which is to be actively sensed.

Another object of the invention is to provide control devices which are selectively presettable for predetermining a starting column and a terminating column between which the card sensing devices will be active during a card feeding operation.

Another object of the invention provides a presettable control means which is adapted for controlling a reduced card speed operation relative to the predetermined active card sensing operations.

As a further object the invention provides in rotary sensing devices operable by a record card an improved means wherein operation of the sensing devices will directly effect pulsing circuits in accordance with a series of selective data designations on the record card. As a further object, the invention provides circuit means common to all the pulsing circuits and which means include control devices therefor to render said circuit active upon the movement of a record card to a preselected position determined in accordance with the differential adjustment of a manually presettable control means.

Other objects of the invention will be pointed out in the following description and claims and illustrated in the accompanying drawings, which disclose by way of example, the principle of the invention and the best mode, which has been contemplated, of applying that principle.

In the drawings:

Figs. 1–1A when arranged with Fig. 1A at the right of Fig. 1 constitute a plan view of the machine embodying the invention.

Figs. 2–2A when arranged with Fig. 2A at the right of Fig. 2 constitute a right cross sectional elevation of the machine taken on line 2—2A of Figs. 1–1A.

Fig. 8 is an exploded isometric view showing manually settable control devices for selectively predetermining a field or portion of a record card which will be active for effecting pulsing operations during the movement of a record card past the sensing station.

Fig. 9 is a diagrammatic illustration showing the electrical instrumentalities and wiring circuit connections used herein to disclose the present invention.

*Record feeding and sensing passage*

Figure 1:
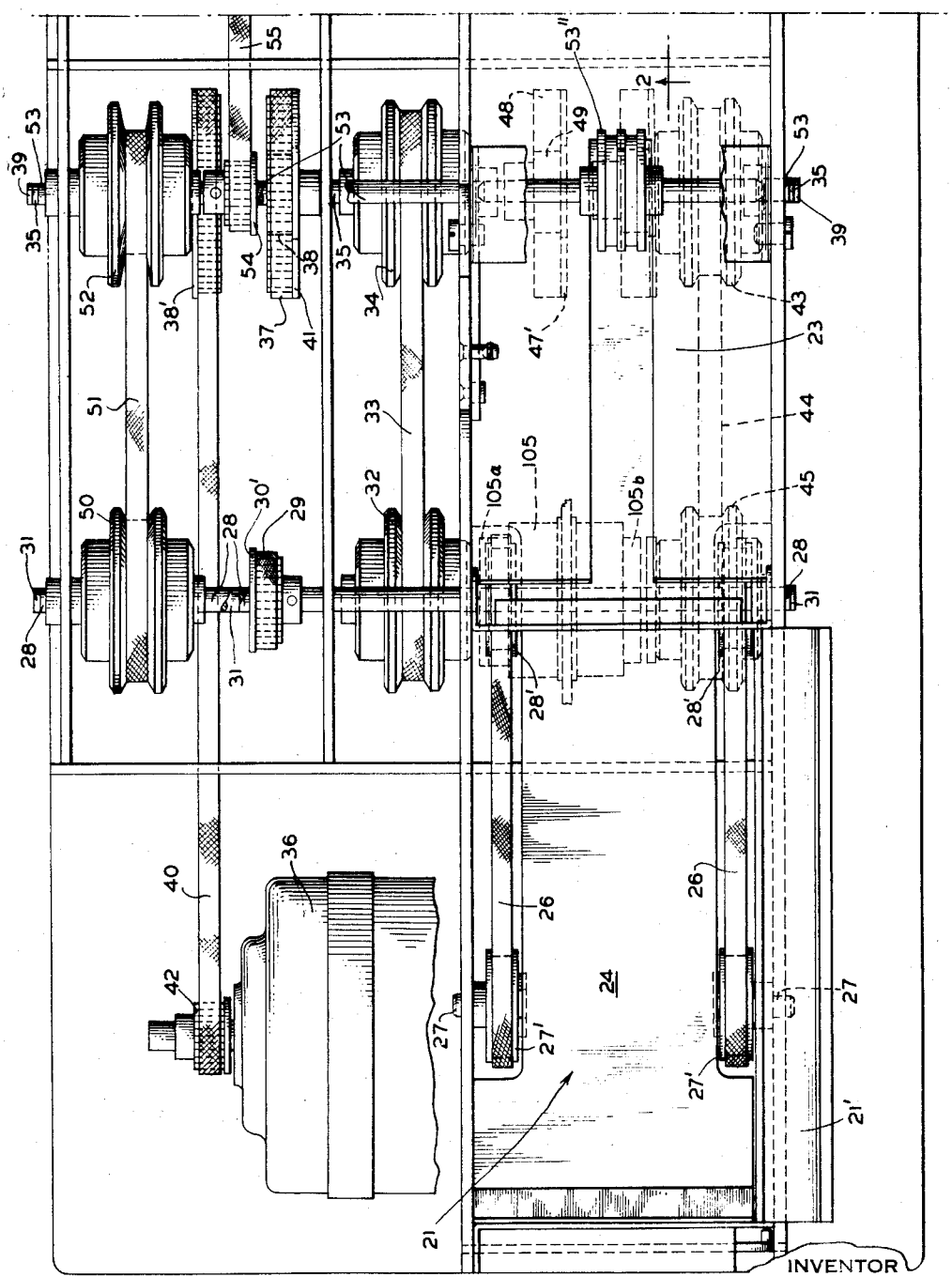
Figure 2:
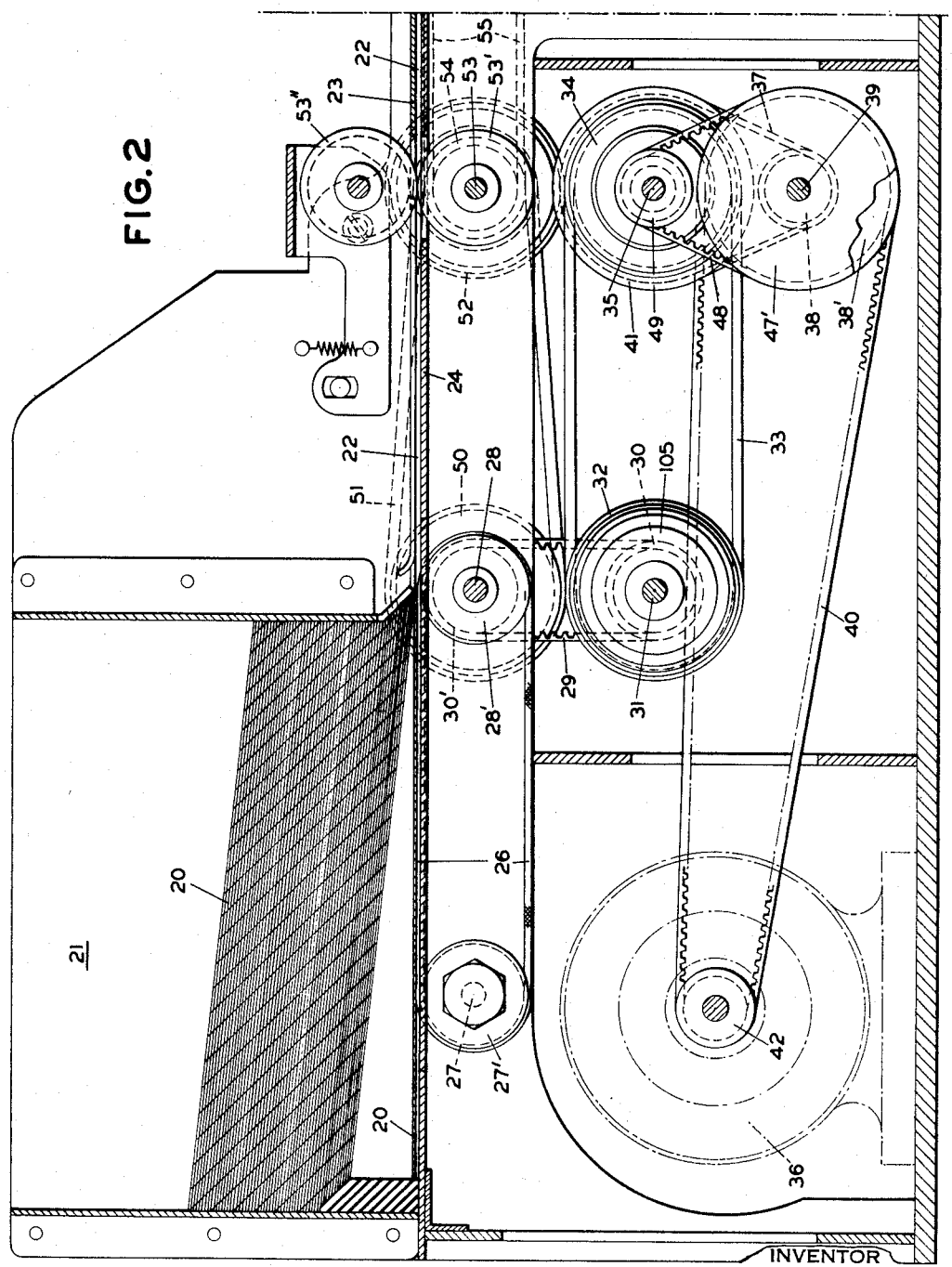
Figure 2A:
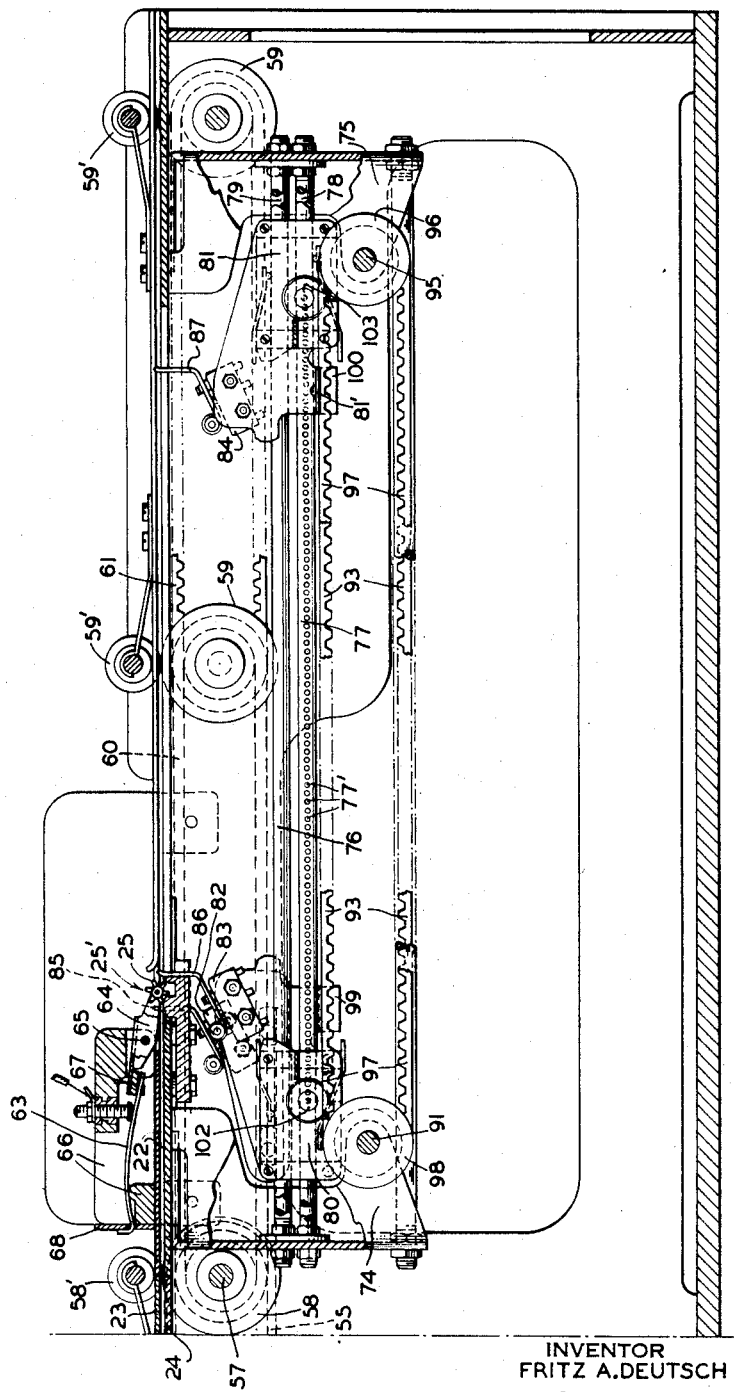
Figure 3:
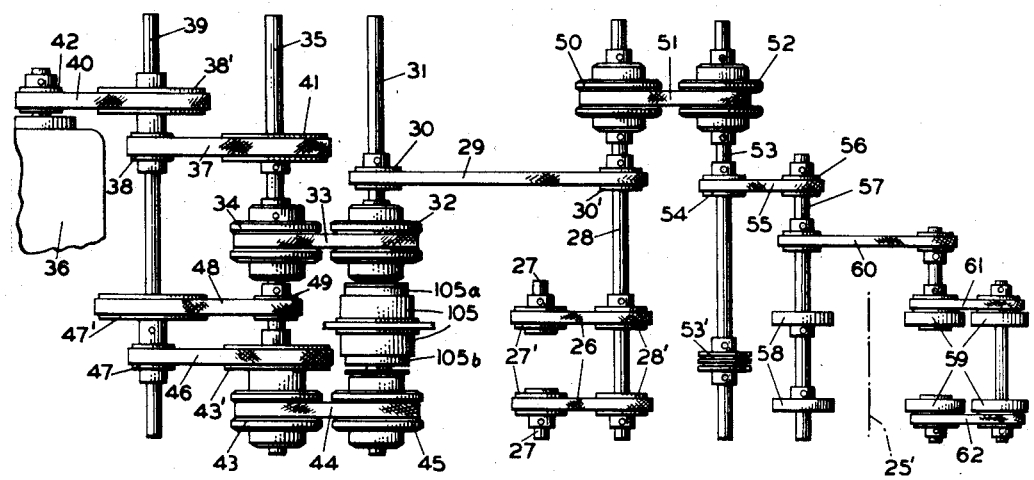
Fig. 3 is a diagrammatic plan view illustrating the devices which feed the record card through the card feeding passage and past the sensing station.

With reference to Figs. 2–2A of the drawings, source record cards 20 of the type earlier set forth are stacked within a hopper 21, such as that disclosed in the copending application Serial Number 613,520, filed October 2, 1956, by Fritz A. Deutsch et al., and now abandoned. The cards are fed seriatim from said hopper into a passage 22 formed by guide plates 23—24 and along which the cards are subsequently moved past suitablet sensing elements 25 in the manner and for the purpose as hereinafter to be described. As shown in Figs. 1–1A and 2–2A the record cards 20 are fed from hopper 21 and into passage 22 by means of a pair of conveyor belts 26, mounted in parallel spaced relation upon suitable end pulleys 27'—28' fast upon support shafts 27—28, journalled within the framing of the machine. Shafts 27—28 are driven through means of an electric motor 36 in the manner to be described with particular reference to the card feed devices as diagrammatically illustrated in Fig. 3. Journalled within the framing of the machine is a second transverse shaft 31, upon which is secured a pulley 30 having drive belt connection 29 with a pulley 30' fast upon the drive shaft 28 for conveyor belts 26. Loosely mounted upon shaft 31 is a pulley 32 having drive belt connection 33 with a pulley 34 fast upon a shaft 35 upon which is also secured a pulley 41 having drive belt connection 37 with one wheel 38 of a compound pulley 38—38'. Pulley 38—38' is loosely mounted for rotation upon a transverse shaft 39 and pulley 38' has belt connection 40 with a pulley 42 fast to the drive shaft of motor 36.

Freely rotatable upon shaft 35 is a compound pulley 43—43', the wheel 43 of which has drive belt connection 44 with a pulley 45 freely rotatable upon the support shaft 31 and being similar to the pulley 32. Wheel 43' has belt connection 46 with the wheel 47 of a compound pulley 47—47' fast upon support shaft 39, while wheel 47' has belt connection 48 with a pulley 49 fast to the shaft 35. Thus it will be apparent that pulley 45 is adapted for operation by motor 36 at a speed reduced to that as effected to pulley 32 by said motor. Spaced between the two operating pulleys 32, 45 and being fast upon the shaft 31 is a magnetic clutch member 105 of well-known structure and said clutch, as in the manner to be hereinafter described, is normally magnetically biased for frictional engagement with the higher speed pulley 41 so as to effect initial high speed operations to the shaft 31, the conveyor belts 26 and to other feed devices in train therewith which act to advance the record card to the sensing station 25' and thereafter to eject the card from said passage, as will now be described.

Drive shaft 28 for the initial feed conveyor means 26 has mounted thereon a pulley wheel 50 having drive belt connection 51 with a pulley wheel 52 secured upon a shaft 53. Each of the pulleys 50 and 52 are constructed in two parts which are adapted to be split apart so that the related halves are slidable for lateral adjustment along their respective support shafts 28 and 53. Thus belt connection 51 may be caused to engage said pulleys at selective radii, whereby shaft 53 will be driven at a faster speed to the drive shaft 28 for conveyor belts 26 as in accordance with such adjustment of the pulleys 50 and 52. Fast to the shaft 53 for pulley 52 is a pulley wheel 54 having belt connection 55 with a pulley 56, fast to the transverse shaft 57. Upon shaft 53 is secured a feed roll 53' and upon shaft 57 is secured a pair of spaced feed rollers 58, said feed rollers all being driven through means of drive belt 51 at faster peripheral speeds to the speed of the conveyor belts 26. Rollers 53' and 58 have suitable pressure rolls 53'' and 58' (Figs. 1–1A) cooperable therewith for feeding a record card to the sensing station 25' (Fig. 3) and away from the succeeding card which is being fed into the passage 22 by conveyor belt means 26. Thus during a first portion of the feed operations a space will be effected between the adjacent succeeding cards, for a purpose as hereinafter to be described. Following such movement of a card to the sensing station 25' additional feed rollers 59, each having a cooperating pressure roll 59' (Fig. 2A) and being driven in 1:1 ratio with the rollers 58 by means of drive belts 60—62, will act to eject the cards from passage 22 and into suitable storage hopper means for stacking the cards.

*Record card sensing means*

During the movement of a record card 20 along the passage 22 data columns on the card are sensed successively at the sensing station 25' represented in general by a row of separate sensing elements 25 of the well-known star wheel type. The sensing wheels 25 extend in a line transversely of the passage 22 and correspond in number and position to the twelve index point positions of a record column of the card. Each sensing wheel 25 controls the opening and closing of an individual related contact element 63 and so will directly effect thereby a series of electrical impulses to related read-out circuit leads 127, said impulses being in accordance with a series of data perforations within a selective group of columns on the card sensed by the related wheels 25 during a movement of the record card past sensing station 25', all as in the manner and purpose set forth more fully in connection with the wiring circuit means illustrated in Fig. 9. All of the sensing members 25 and related contact elements 63 are of identical structure, as will now be described in connection with Figs. 4–7, which show in enlarged detail form one order of the above devices in the various positions of their operation assumed during a record card movement.

Figure 4:
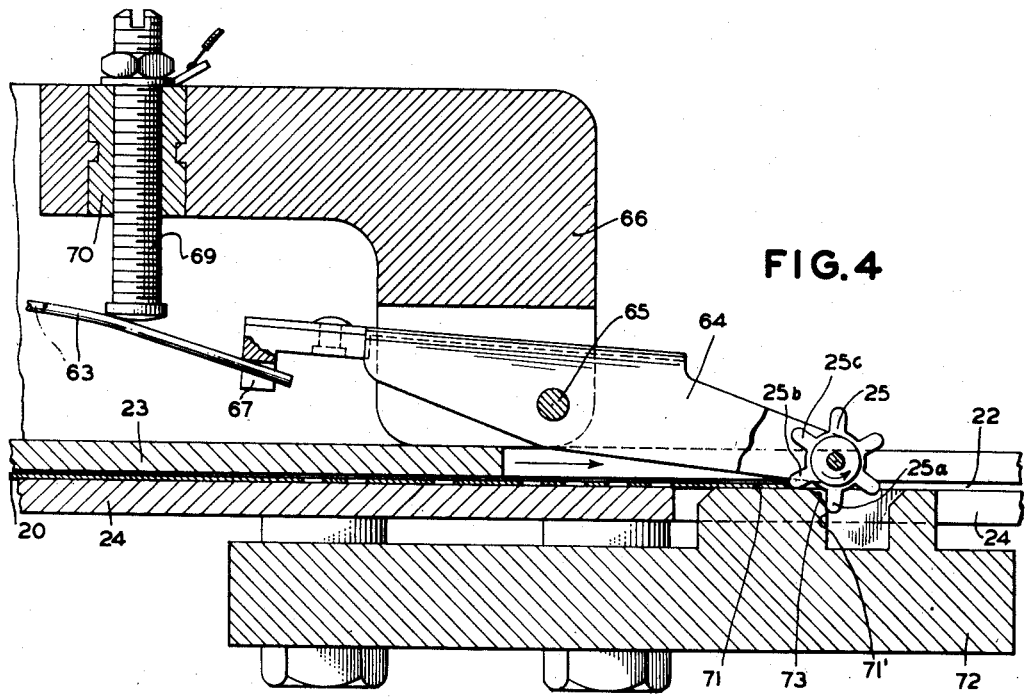

The sensing wheels 25 are each rotatably mounted upon the remote end of related levers 64 fulcrumed upon a transverse rod 65 supported within the ends of a transverse frame 66 mounted above the upper surface of the guide plate 23, which plate together with bottom guide plate 24 forms the record card feed passage 22. Upon the opposite end of each of the levers 64 is mounted an insulation block 67 each having engagement with a related contact element 63 above set forth. Contact elements 63 are formed of spring stock and being all suitably anchored within a common contact bar 68 (Fig. 1A) secured to and electrically insulated of the frame member 66. Contact elements 63 are constantly urged toward engagement with related contact studs 69 mounted within the frame 66 and each electrically insulated thereof through means of suitable insulation collars 70 (Fig. 4). Thus in the normal position of the parts, illustrated in Fig. 4, contact elements 63 will serve to hold each of their related levers 64 in a clockwise position, wherein one tooth 25b of a pair of angularly adjacent teeth of the star wheels 25 is held into engagement with an upper surface 71 of a transverse plate 72, secured to the bottom surface of the guide plate 24. The tooth 25a of said pair of teeth has engagement with a surface 71' of the plate 72, said latter surface being in a plane perpendicular to the plane of surface 71. Thus a cam surface 73 of said plate formed at the apex of said surfaces is adapted to extend within the space as formed by a pair of adjacent teeth of the star wheels 25.

Figure 7:
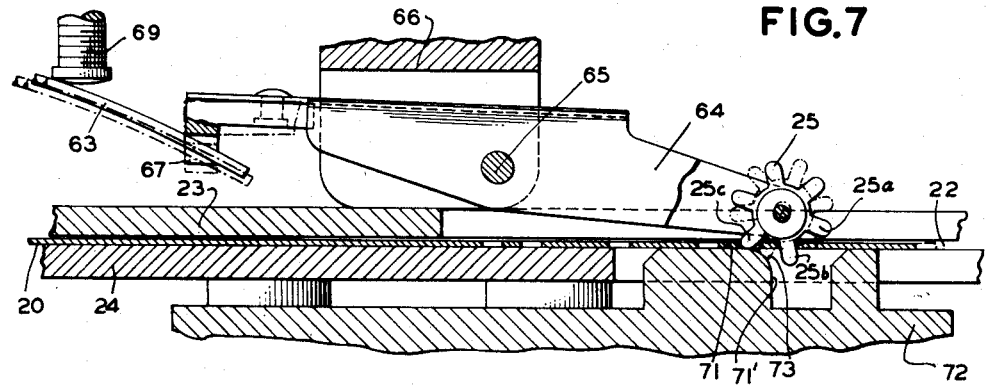
Figs. 4–7 are enlarged detail views showing in various positions of operation one of the card perforation rotary sensing members and means cooperable therewith for effecting electrical impulse signals.
Figure 5:
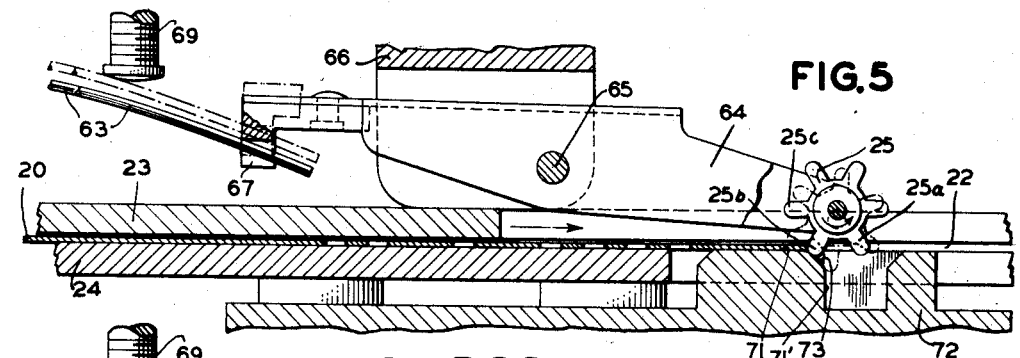
Figure 6:
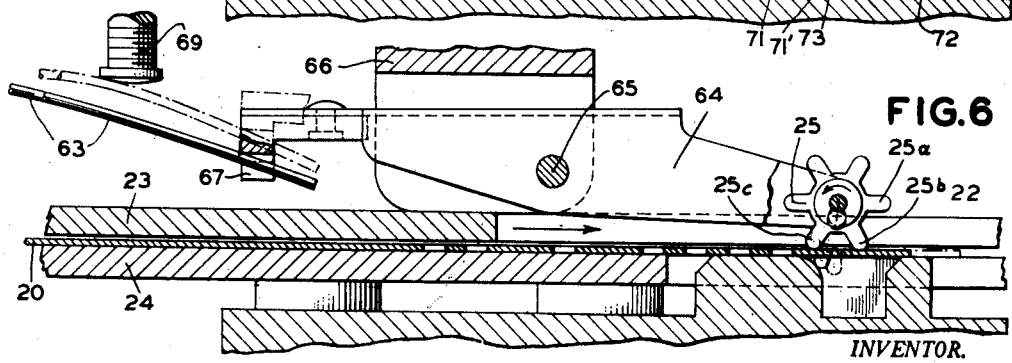

As a record card 20 is fed along the passage 22, in an operation of the card feed devices earlier set forth, a leading edge of the card will effect engagement with the tooth 25b and will rotate the wheel 25, so that, said tooth engaging cam surface 73 will rock the related lever 64 in a counterclockwise direction, to the position as illustrated in Fig. 5. There will be no perforations in the marginal portion of the record cards and as the card movement continues to rotate the wheels 25 a next succeeding tooth 25c of each of the wheels engages the marginal top surface of the card and will rock the respective levers 64 counterclockwise to a position wherein the teeth 25b and 25c of all the wheels 25 rest upon the card, as illustrated in Fig. 6. In the above operation all of the contact elements 63 are thus caused to be rocked downwardly out of engagement with their respective contact studs 69. As a record card continues in movement past the sensing station 25' the record columns are brought successively into sensing position and where the corresponding index point position contains a code hole the tooth 25c of the related star wheel 25 will first enter such code hole until stopped by engagement with the surface 71 of plate 72, as illustrated in Fig. 7. Thereafter the card movement will rotate tooth 25c over the cam surface 73 of plate 71 and cause a reciprocatory movement to be effected to the related lever 64.

From the foregoing it will be apparent that code perforations may be spaced within a card at wide intervals or in a series of closely spaced intervals and that operations as effected by such perforation to the related star wheels 25 will, through the means of cam member 73, cause a corresponding series of oscillations to be effected to the related levers 64. Such oscillations of levers 64 are adapted to effect a corresponding series of make and break operations to the related contact elements 63 for directly effecting thereby a series of electrical read-out impulses which are to be selectively transmitted to the usual relay devices A (Fig. 9) adapted for controlling operations of a tabulating machine or the like in the well-known manner. Special means are provided, however, whereby such electrical impulses will be effected as relates only to those code perforations as appear within in a portion or field of the record card selectively predetermined, as in the manner now to be described.

*Means selectively settable for predetermining an active card field*

With particular reference to Figs. 2A and 8, dependent from the underside of the lower guide plate 24 of the card passage 22 earlier described are left and right side frame plates 74—75. Extending longitudinally within plates 74—75 are four parallel contact bars 76—79, grouped as shown, and having mounted for slidable movement thereon a pair of contact support blocks 80—81. Slide block 80 has fast thereon a pair of snap switch members 82—83, while block 81 has fast thereon a snap switch 84. Each of said switches is provided with a related control lever 85, 86 and 87 respectively, which extends upwardly and within the record card passage 22. As in the manner and purpose to be more fully described hereinafter with reference to the wiring diagram of Fig. 9, each of the levers 85, 86 and 87 is adapted for operation by a leading edge of a record card 20 to effect engagement of the contacts of said switches during a movement of the card through said passage and will thereafter be released to normal setting to release said contacts as the training edge of a card moves out of engagement with the said levers. The levers 85—87 being spaced between the rows of coded perforations so as to pass along the imperforate portions of the record cards during said movement thereof as illustrated by means of the broken lines shown in Fig. 9. Slide block members 80 and 81 are adapted to be adjusted independently along the contact bars 76—79 by means of manual control knobs 88 and 89 as hereinafter described, whereby, the longitudinal position of levers 85—86, and lever 87 relative to the sensing wheels 25, as represented by the sensing station 25', may be selectively predetermined. It will be noted that, for the purpose to be described later, lever 85 is fixed upon slide block 80 in a manner to be engaged by a record card 20 prior to the engagement of the record card with the control lever 86 on said block.

Control knob 88 has pin and slot connection 90 with an operating shaft 91 journalled within the frame plate member 74 and having pinned thereto a cog pulley 92 upon which is mounted one end of a cog belt 93. The opposite end of belt 93 is supported upon a cog pulley 94 loosely mounted upon a shaft 95 supported for rotation within frame plate 75. Shaft 95 is connected by pin and slot means 95' to control knob 89 and has fast thereon a cog pulley 96 upon which is mounted one end of a cog belt 97, the opposite end of said belt being mounted upon a cog pulley 98 loosely mounted for rotation upon the shaft 91. Belt 93 is secured by clamp means 99 to a lug 80' of slide block 80, while belt 97 is secured by means of clamp 100 to a lug 81' of slide block 81. Thus by means of the manual control knobs 88-89 the related slide blocks 80 and 81 may each be selectively adjusted to position the corresponding control levers 85, 86 for switch members 82, 83 and control lever 87 for the switch 84 along contact bars 76–79 as in accordance with suitable scaled graduations 101 (Fig. 1A) which correspond to the eighty columns of the well-known record cards 20. Each of the slide blocks 80 and 81 has mounted therein a suitable spring plunger means 102—103 engageable with indentures 77' graduated along contact bar 77 and adapted for maintaining said slide blocks, with the respective levers 85, 86 and 87 associated therewith, in the positions as adjusted by their respective control knobs 88 and 89.

It will be recalled that a magnetic clutch means 105 (Figs. 1, 3) is biased normally in an operated condition for frictional drive connection with the higher speed drive wheel 32, so that, record cards 20 are fed rapidly into the feed passage 22 and thence to the sensing station 25'. For any columns on the record card in which the sensing devices are to be active in accordance with the above adjustment of control knobs 88, 89, however, the record cards during such sensing operations are to be advanced at a slower speed and thereafter following such sensing operations the cards are again to be fed at the greater speed, as will now be described with relation to the circuit devices illustrated in Fig. 9.

To receive a stack of record cards 20 one panel 21' (Fig. 1) of hopper 21 is hinged and when a stack of record cards has been placed in said hopper a closure of said panel thereafter will act to effect engagement of a contact switch 106 in the plus circuit lead 107 for starting motor 36. Upon such closure of switch 106 a plus circuit from lead 107 is also extended to the positive side of the coils 105a and 105b, said coils being a part of the magnetic clutch means 105 in the drive train for the card feed devices, earlier described in connection with Figs. 1 and 3. Coils 105a and 105b are adapted to receive ground circuit through means of a double pole switch 108, under control of a relay 109, in the manner to be described.

Switch 108 is normally closed to the magnet coil 105a, and is open to the coil 105b, so that, coincident with a closure of switch 106 to start motor 36 coil 105a is caused to be energized and will engage said clutch with the high speed drive wheel 32 (Fig. 3), which thereupon will operate the feed devices for entering a bottom card of the stack within the passage 22 and to bring said card to the sensing station 25', as in the manner earlier described. During such a movement of the record card data representing perforations within the cards may engage with the related rows of sensing wheels 25 and will rotate said wheels, thereby causing engagement of the related contact elements 63 with the corresponding contact studs 69, as in the manner earlier described. It will be recalled, however, that the contact elements 63 are all mounted upon the common circuit bar 68 and, with reference to Fig. 9, it is noted that the ground circuit lead 110 for said bar includes a normally open switch member 111. Therefore the above-described operations of the contact elements 63 with studs 69 will at this time be ineffective of causing electrical impulses. In the above-described movement of the record card a leading edge of the card will eventually engage with the control lever 86 of the switch member 83 adjusted according to the selective setting of the slide block 80, as earlier described, and will depress said lever to effect the closure of a pair of contacts 83' of said switch. One of the contacts 83' has connection 112 with a contact element 113 having slidable engagement with the contact bar 76, connected to ground as shown. The other of contacts 83' has circuit connection 114 with a contact element 115 having slidable engagement with contact bar 78. Bar 78 has circuit lead 116 to the negative side of a relay member 117, which relay is adapted for controlling the operations of the ground circuit switch means 111 for the common circuit bar 68, as in the manner to be described.

Thus, in accordance with an adjustment of slide block 80 by control knob 88, earlier described, a record card 20 is adapted to engage with control lever 86 and effect an engagement of contacts 83' at substantially such times as a selective column of the data perforations on the card is brought into cooperation with the sensing wheels 25. Upon such closure of contacts 83' ground circuit is extended from contact bar 76, lead 112, contacts 83', lead 114, contact bar 78 and lead 116 to the negative pole of relay 117, and the positive pole for said relay being connected, by means of lead 118, to the master plus circuit lead 107 said relay is thus energized to cause engagement of switch 111 and extend ground circuit to the common circuit bar 68 of the contact studs 69. During a continued movement of the record card past the sensing station 25' any subsequent data perforation appearing within the card will now, upon operating the sensing wheels 25 and contact elements 63, cause electrical impulses corresponding therewith to be made to suitable related relay members A; said relays being adapted for the control of tabulating machines, or the like, in the manner and purpose will known to those skilled in the art.

It will be recalled that a switch member 84 is mounted upon a slide block 81 (Fig. 8) settable along the card passage 22 by means of the manual control knob 89, and that a closure of the contacts 84' of said switch by the engagement of a record card with the switch control lever 87 may occur relative to any selective column within the record card for which it is desired to have the pulsing operations terminate. One of the contacts 84' of switch 84 has circuit connection 119 with a contact leaf 120 in slidable engagement with the grounded contact bar 76, while the other of contact member 84' has circuit connection 121 with a contact leaf 122 in slidable engagement with the circuit bar 77. Bar 77 has circuit connection, through a lead 123, with the negative side of a relay member 124, and, the positive side of said relay having circuit lead 118 to the service line 107, said relay 124 will become energized upon said engagement of contact members 84' of switch 84 and will terminate such pulsing operations, as in the manner to be described.

With reference to the earlier described operation of contact members 83' of control switch 83 by the record card, it will be noted, that, as the card traverses control lever 86 the said contacts are maintained in engaged condition. For the purpose hereinafter more fully described, however, a suitable capacitor means 114' in the circuit line 114 will act to control a momentary operation of relay 117 by contacts 83', sufficient to close switch 111 and connect ground circuit to the common circuit bar 68 of the sensing devices. During such momentary operation of relay 117, however, a pair of contact members 117' thereof are caused to be engaged and will effect a holding circuit to said relay, through means of lead 125 extended to ground through the normally closed contacts 124' of the above-described relay 124. In the above-described operation of switch 84 and consequent energizing of relay 124 the contacts 124' will be opened to release the said ground holding circuit means for relay 117 and said relay 117 thereupon releases ground circuit switch 111 for bar 68, whereafter subsequent data perforations of the card as carried past the sensing station 25' are now inactive relative to effecting a pulsing operation to the relay members A.

As earlier set forth, it is desirable that during card sensing operations the record card feed devices operate at a slower speed than is used for the feed in and feed ejection operations. It will be recalled that a switch member 82 is mounted upon slide block 81 for adjustment simultaneously with the above-described switch member 84 and that control arm 85 for switch 82 is adapted to be engaged by the record card just prior to the operation of the control lever 86 for switch member 84. Switch member 82 includes a pair of normally open contact members 82' one of which is connected by means of lead 112 to a contact leaf 113 having slidable engagement with the ground circuit bar 76. The other of the contacts 82' has connection by means of circuit lead 126 to a contact leaf 127 having slidable connection with the contact bar 79, said bar being connected by lead 128 to the negative end of the coil for relay 109 controlling switch means 108 for the magnetic clutch 105 of the feed devices earlier described. Positive side of relay coil 109 is connected to lead 118 and thence, through lead 107, to the starting switch 106, closed to plus source in the operation of said switch, earlier described. Thus, upon engagement of a record card with the control lever 85 said lever will be depressed to cause engagement of the contacts 82' of switch 82, thereby closing the above-described ground circuit and energizing the said relay 109. It will be noted that, for the purpose to be hereinafter described, a suitable capacitor means 126' is included in the circuit lead 126, whereby switch member 82 effects but momentary impulse to the relay 109. During such operation, however, suitable contact members 109' of relay 109 are brought into engagement for effecting a holding circuit to said relay from the lead 125, which extends to ground through relay switch 124' earlier described.

It is recalled that, upon operation of starting switch 106 for motor 36, a plus circuit is extended through lead line 107 to the positive side of the coils 105a and 105b of the magnetic clutch means 105 for the card feed devices. It is also recalled that the negative side of coil 105a which controls the higher speed operations of said clutch, includes ground connection through the normally closed contacts of a double pole switch means 108 related to the relay 109. Upon said energizing of relay 109, therefore, in the above-described operation of control lever 85 by the record card 20, switch means 108 is operated to open the ground circuit and de-energize the high speed control coil 105a of clutch 105 and to establish said ground circuit to energize the low speed control coil 105b of said clutch. Thus prior to engagement of record card 20 with the control lever 86 for activating the pulsing circuit means the magnetic clutch 105 is released from high speed drive wheel 32 (Fig. 3) and will effect frictional drive engagement with the drive wheel 45, driven at slower speed to the wheel 32, as in the manner heretofore described. As a final perforated data column, as selected upon record card 20 for which pulsing operations are to be terminated effects operation of the sensing wheels 25 a forward edge of the card at that time engaging control lever 87 closes contacts 84' and will effect operation of relay 124 to open switch 124' of holding circuit 125, thereby de-energizing both the relay 117 and the relay 109. De-energizing relay 109 restores switch member 108 for re-energizing the high speed control magnet 105a of clutch 105, while also disabling ground circuit from said switch to the low speed control magnet 105b, so that, faster speed movement of the record card is now caused to be resumed at this time.

During the feeding of a record card 20 through the passage 22 it may occur that control lever 87, under certain settings for the manual control knobs 88, 89, will come under control of a record card before the card relinquishes control of levers 85, 86. It will be recalled however that suitable capacitor means 126' and 114' are placed in the related circuits for the relays 109, 117 controlled by the levers 85, 86 and that said capacitors will act to permit only a momentary control impulse to the said relays upon closure of the respective switch members 82, 83. Thereafter the said relays will be held by the holding circuit means earlier described and are independent of control levers 85, 86 until after the said levers are released from the trailing edge of the record card. Upon such release of levers 85, 86 suitable contact members 82" and 83" of the respective switches 82, 83 are brought into engagement for effecting normalizing of the capacitor means 126, 114.

Also, it may occur during a feeding of successive record cards through the passage 22 that control levers 85, 86 may be operated by a succeeding card before a preceding card relinquishes control of the lever 87. To avoid conflict in the control at such times therefore suitable capacitor means 121' are included in circuit lead 121 and in the operation of contacts 84' by control lever 87 said capacitor will permit only momentary operation sufficient for disengaging contacts 124' of the holding circuit for relays 109 and 117. Upon release of control lever 87 from the trailing edge of a record card suitable contact members 84" of switch 84 will be brought into engagement to cause a discharge of capacitor 121' and restore the circuit to the normal condition of control ready for a subsequent card.

It will be apparent from the above description, that where a series of record cards 20 are fed seriatim through the passage 22 a suitable spacing must be effected between each card so as to permit the above-described restoration of the control levers 85–87 for normalizing the circuits to the control of each succeeding card. Such a spacing of the record cards, it will be recalled, is accomplished by means of the pulley 52 (Figs. 1, 3) being driven by belt 51 for moving a record card to the sensing station at faster speeds than at entrance of the cards into passage 22 by the conveyor belts 26.

While there has been shown and described the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

I claim:

1. In an apparatus of the class described having means providing a record card feeding and sensing passage, a sensing station in said passage including a plurality of sensing members each selectively operable by a related row of data representing designations in a movement of the record card past said sensing station, an electrical contact element associated with a related one of said sensing members; in combination therewith a normally open control circuit in common to all the said contact elements, control devices for said circuit including means operable by a movement of the record card for closing said control circuit, and wherein the said means operable by the record card is stationary with respect thereto and is adapted for adjustment along said passage independently of the feed of the card and is settable at any time to a plurality of selective positions relative to the sensing station whereby the said operation thereof is adapted to occur in a selective predetermined movement of the record card relative to the said sensing station, and wherein the data designations as thereafter carried past the sensing station in a further movement of the record card following the said predetermined movement of said card will effect an operation of the sensing members and cause thereby electrical impulses in accordance therewith and wherein during a still further movement of the record card the trailing edge thereof releases the said control devices and thereby reopens said control circuit.

2. In an apparatus of the class described having means providing a record card feeding and sensing passage, a sensing station in said passage including a plurality of sensing members each selectively operable by a related row of data representing designations in a movement of the record card past said sensing station, an electrical contact element associated with a related one of said sensing members; in combination therewith a normally open control circuit in common to all the said contact elements, control devices for said circuit including means operable by a movement of the record card for closing said control circuit, and wherein the said means operable by the record card is stationary with respect thereto and is adapted for adjustment along said passage independently of the feed of the card and is settable at any time to a plurality of selective positions relative to the sensing station whereby the said operation thereof is adapted to occur in a selective predetermined movement of the record card relative to the said sensing station, and wherein the data designations as thereafter carried past the sensing station in a further movement of the record card following the said predetermined movement of said card will effect an operation of the sensing members and cause thereby electrical impulses in accordance therewith, a second control means for said common circuit including means adapted for operation by a movement of the record card, and wherein the said second control means is adjustable along said passage independently of the first said control means, and is settable at any time to a plurality of selective positions relative to the sensing station whereby an operation thereof is effected in a selective predetermined movement of the record card relative to the sensing station and wherein said operation thereof will act to disable the said common control circuit and thereby terminate said electrical impulses, and wherein data designations thereafter carried past the sensing station in effecting operations of the sensing members and associated contact elements are ineffective of emitting electrical impulses.

3. In a machine of the class described the combination of means providing a record card feeding and sensing passage, a sensing station in said passage including a plurality of sensing members each selectively operable by a related row of data-representing designations in a movement of the record card past the said sensing station, contact elements operable each by a related one of said sensing members for effecting electrical impulse signals, circuit means in common to all the said contact elements including a normally open relay switch for excluding said impulse signals during card sensing operation of said sensing wheels, a control switch for said relay operable by the record card and being adapted for manual adjustment selectively in alternative directions along the sensing passage to a predetermined one of a plurality of selective positions relative to the sensing station, and wherein operation of said control switch is effected in selected movement of the record card determined in accordance with said manual adjustment, whereby to cause operation of said relay switch for closing the said common circuit and thereby selectively determine a first data designation operable at the sensing station to effect an electrical impulse during a movement of the record card and wherein a trailing edge of the record card in a movement thereof subsequent to any said selected movements of said card will act to release said relay switch and thereby reopen the said common circuit.

4. In a machine of the class described the combination of means providing a record card feeding and sensing passage, a sensing station in said passage including a plurality of sensing members each selectively operable by a related row of data-representing designations in a movement of the record card past the said sensing station, contact elements operable each by a related one of said sensing members for effecting electrical impulse signals, circuit means in common to all the said contact elements including a normally open relay switch for excluding said impulse signals during card sensing operation of said sensing wheels, a control switch for said relay operable by the record card and being adapted for manual adjustment selectively in alternative directions along the sensing passage to a predetermined one of a plurality of selective positions relative to the sensing station, and wherein operation of said control switch is effected in selected movements of the record card determined in accordance with said manual adjustment, whereby to cause operation of said relay switch for closing the said common circuit and thereby selectively determine a first data designation operable at the sensing station to effect an electrical impulse during a movement of the record card, a second control switch for the said relay switch, means for effecting an operation of said second control switch by a movement of the record card, and wherein the last said means is adjustable along the sensing passage independently of the first said adjustable control switch to a plurality of selective positions relative to the said sensing station so that an operation thereof is effected at a predetermined position of the record card for releasing said relay switch to open the said common circuit and selectively predetermine thereby a final data designation which is to be active for effecting an electrical impulse at the sensing station during a card movement.

5. In an apparatus for manifesting data contained source records as data representing designations and having means providing a record card feeding and sensing passage, a sensing station along said passage including a plurality of toothed sensing members rotatable by related series of data representing perforations engageable therewith in a movement of a record card past the sensing station; the combination of circuit contact elements adapted to be oscillated by a related one of said sensing members for effecting a series of electrical pulses, a fixed element engageable by successive teeth of the said sensing members during a card movement whereby to cause an oscillating movement of the said sensing members, a plurality of control devices each one adjustable relative to the other and to a plurality of control positions along said passage whereby to cooperate for limiting the pulsing operations of the sensing means to a selective active group of said data perforations moved past the sensing station comprising circuit means in common with said contact elements and having a normally open relay therein for disabling the pulsing circuits, a first control switch being in circuit with said relay and operable by the record card for closing said relay to enable said pulsing circuits, means supporting said switch for slidable adjustment along said passage to selective positions relative to the said sensing station, a second control circuit for said relay including a second switch adapted for slidable adjustment along said support means to selective positions relative to the said sensing station and being operable by the record card for releasing said relay to disable the said common circuit and thereby terminate said pulsing operations, and a manually operable means for adjusting at will each of said switches independently to the said selective positions for selectively predetermining at any time initial and final data perforations of the said selective group active for effecting pulsing operations during the movement of a record card past said sensing station.

6. In an apparatus for manifesting data contained source records as data representing designations and having means providing a record card feeding and sensing passage, a sensing station along said passage including a plurality of toothed sensing members rotatable by related series of data representing perforations engageable therewith in a movement of a record card past the sensing station; the combination of circuit contact elements oscillated by a related one of said sensing members for effecting a series of electrical pulses, control devices for limiting the pulsing operations to a selective active group of said data perforations moved past the sensing station comprising circuit means in common with said contact elements and having a normally open relay therein for disabling the pulsing circuits, a first control switch being in circuit with said relay and operable by the record card for closing said relay to enable said pulsing circuits, means supporting said switch for slidable adjustment along said passage to selective positions relative to the said sensing station, a second control circuit for said relay including a second switch adapted for slidable adjustment along said support means to selective positions relative to the said sensing station and being operable by the record card for releasing said relay to disable the said common circuit and thereby terminate said pulsing operations, and a manually operable means for adjusting each of said switches independently to the said selective positions for selectively predetermining initial and final data perforations of the said selective group active for effecting pulsing operations during the movement of a record card past said sensing station, and including a capacitor in the circuit with said first control switch to the said normally open relay said capacitor being adapted for effecting a momentary circuit for energizing said relay in the said operation of the first control switch by a record card, self-closing circuit means for maintaining the said relay in said energized condition including a normally closed relay switch in said self-closing circuit, and circuit means between said second control switch operated by the record card and the last named relay including a capacitor for effecting momentary operation of said relay upon an operation of said second control switch by the record card whereby the said holding circuit is caused to be released to restore the pulsing control circuit to normal ineffective condition.

7. The invention according to claim 5 including feeding means operable to feed record cards seriatim into said passage and past the said sensing station, an electric motor, a first operating drive between the motor and said feeding means including a magnetic clutch energized in engaged position upon initiation of motor operation, a second operating drive being in train with the said first drive and including a magnetic clutch normally deenergized and in disengaged position, and wherein the second clutch is driven at a reduced speed to the said first clutch, circuit control means including a relay member in common to both the said clutches, a third switch member operable by the record card and being adapted to effect operation of said relay member to deenergize and release the first magnetic clutch while energizing the second magnetic clutch into engagement for effecting a reduced speed movement to the record card, and wherein the third switch member is mounted for slidable movement upon the said support means for manual adjustment with the first switch member to a related selective position therewith along said passage, whereby said reduced speed movement of the record card is caused to be effected substantially as a first data-representing perforation of said selective active group is brought to the said sensing station.

8. The invention in accordance with claim 7 and wherein the means for manually adjusting the said control switches operable by the record card include a first gear tooth belt extending parallel to the said card passage, a second gear tooth belt extending parallel to the said card passage, means connecting said first gear tooth belt with the said first and third of said switch members, means connecting the said second gear tooth belt with the said second of said switch members, drive means for said first belt including a drive shaft having a gear wheel fast thereto in engagement with said belt, drive means for said second belt including a drive shaft having a gear wheel fast thereto in engagement with said second belt, a gear wheel freely rotatable upon each of the said drive shafts for supporting the opposite ends of the respective belts, and manually operable means for independently rotating each of said drive shafts.

9. The invention according to claim 7 including a capacitor in circuit between said first control switch and said normally open relay and adapted upon said operation of said first control switch by the record card to cause a momentary energizing of said relay, a capacitor in circuit between the said third switch member and the said clutch control relay said capacitor being adapted to control momentary operations of said relay upon operation of said third switch member by the record card, holding circuit means related to each of said relays for maintaining the said relays in such energized condition and including a normally closed relay switch in common circuit therewith, and circuit means between the said normally closed relay and the said second control switch including a capacitor adapted in an operation of said second control switch by the record card to control momentary operation of said relay for releasing the said holding circuit and thereby restore the pulsing circuit to a normal ineffective condition and to concurrently therewith effect a release of the said reduced speed clutch and reengagement of the said first speed clutch.

10. The invention according to claim 9 including a control circuit for each of the said capacitor circuits each control circuit embodying a contact element in normal engagement with the related one of said card operated switch members and having resistor means in circuit therewith, and wherein an operation of each of said switch members by the record card for energizing the related one of said capacitor circuits will act to open the related one of said resistor circuits, and wherein a continued movement of the record card thereafter frees the respective switches from a trailing edge of the card and effects a reengagement of the related resistor circuit contacts and will act thereby to discharge the corresponding capacitor circuits.

11. In an apparatus for manifesting data contained in source records as data-representing designations and having means providing a record card feeding and sensing passage, a sensing station along said passage including a plurality of sensing members each selectively operable by a related row of data-representing designations moved past the sensing station during record card feeding operations for pulsing related electrical circuits in accordance with said data designations, the combination therewith of control devices adapted for confining such electrical pulsing operations to data designations as sensed within a predetermined selective portion of the record card movement including a control circuit in common with all the said sensing members, a normally open relay switch member in said common circuit, a first control circuit for said relay including a normally open first control switch having a capacitor in the circuit therewith, a support member for said control switch, a plurality of circuit bars having slidable engagement with elements of said switch said bars being in parallel with said card passage and upon which said support member is slidably mounted, self-closing circuit means for the said relay including a normally closed relay switch, control means for said relay switch including a normally open second control switch having a capacitor in circuit therewith, a support member for said second control switch said support member being slidably mounted upon the said circuit bars and wherein the second control switch includes elements having slidable engagement with a plurality of said contact bars, means for manually adjusting each of the said support members along the said contact bars to space the said switch members at selective distances from the said sensing members, and wherein a leading edge of the record card will effect an operation of said first control switch following an extent of movement of the card as determined by said adjustment of said switch to thereby close the said normally open relay switch and render the said common circuit active so that data designations moved thereafter past the sensing station will thereupon effect electrical impulses, and wherein following a selective portion of a movement of the record card as in accordance with the adjustment of the said second control switch a leading edge of the card will effect operation of the said second control switch to energize and open said normally closed relay switch thereby releasing the self-closing circuit and said common circuit means to the open circuit condition whereby said pulsing operations terminate and further pulsing operations by the sensing devices during a continued movement of the record card are prevented.

12. In an apparatus for manifesting data contained in source records as data-representing designations the combination of means providing a record card feeding and sensing passage, a sensing station along said passage including a plurality of toothed sensing members rotatable selectively by related rows of data representing perforations engageable therewith in a movement of a record card past said sensing station, a movable support member for each of said sensing members, a fixed cam member extending within an arc transcribed by the radii of said toothed sensing members and being adapted for engagement by pairs of angularly adjacent teeth on said sensing members, resilient means for holding the toothed sensing members in engagement with said cam member, circuit means including a plurality of contact elements operable each by a related one of said movable support members, and wherein a rotation of the sensing members as effected by a related row of said data perforations in a movement of the record card past the sensing station will cause a successive engagement of said cam by the angularly adjacent teeth of the related sensing members and will impart thereby reciprocatory movements to the related support members, and wherein said movements of said support members will effect make and break operations of the related contact elements and effect thereby a series of electrical impulses in accordance with an operation of the corresponding sensing devices by the related row of said data perforations.

13. The invention according to claim 12 and wherein the said cam member includes a surface adjacent and beneath the plane of movement of the record card and a second surface on a plane perpendicular to said first surface, and wherein the said surfaces are adapted for engagement each by one of a pair of angularly adjacent teeth of said sensing members.

14. In an apparatus of the class described the combination of means providing a record feeding and sensing passage, a sensing station in said passage, record feeding means operable to feed record cards into said passage and past said sensing station, a primary operating train for said record feeding means including a normally engaged clutch, a secondary operating train for said feeding means including a normally disengaged clutch, and wherein said second clutch is driven at reduced speed to said first clutch, control means in common to both the said clutches including devices adjustable along said passage to a plurality of selective positions relative to the said sensing station, and wherein said devices following a predetermined extent of movement of a record card are operable by said card to effect a disengagement of the said first clutch and to concurrently effect engagement of said second clutch so that the speed of movement of the record card is caused to be modified as a predetermined column of the data-representing designations on the record card as selectively determined by the said adjustment of the said control devices passes the said sensing station.

15. The invention according to claim 14 and having a second control means in common to both the said clutches said second control means including devices adjustable along said passage to a plurality of selective positions relative to the said sensing station and wherein said second control devices are operable by the record card following a predetermined extent of movement of the card past the sensing station, and wherein said operation of the second control devices effects disengagement of the said second clutch and reengagement of the said first clutch so that as a predetermined column of said data-representing designations on the record card as selectively determined in accordance with the said adjustment of said second control means passes the sensing station card speed movement is increased for ejecting the card from said passage while bringing another card to active sensing position.

16. In an apparatus of the class described the combination of means providing a record feeding and sensing passage, a sensing station in said passage, feeding means operable to feed record cards into said passage and past said sensing station, an electric motor, a first operating drive between said motor and said feeding means including a magnetic clutch energized in engaged position upon initiation of an operation of said motor, a second operating drive in train with said first drive and including a magnetic clutch normally deenergized and in disengaged position, and wherein the second clutch is driven at reduced speed to said first clutch, circuit control means in common to both the said clutches and being operable by a movement of the record card to effect a deenergizing and release of said first clutch and to energize the said second clutch into active engagement for effecting a reduced speed movement of the record card, and wherein said circuit control means is adapted for manual adjustment along said passage to a plurality of selective positions relative to the sensing station and thereby effect said reduced speed movement while a selectively predetermined portion of the record card moves past the sensing station.

17. In an apparatus of the class described the combination of means providing a record feeding and sensing passage, a sensing station in said passage, an initial feeding means operable to feed record cards into said passage seriatim, a record feeding means in train with said initial feeding means and operable at a faster speed thereto for advancing a leading card away from a trailing card while moving successive cards to the said sensing station, a first drive train in common to both said record feeding means including a magnetic clutch energized for engagement to effect operation of said feeding means, a second drive train for said feeding means operable at reduced speed with said first drive train and including a magnetic clutch deenergized in disengaged position, circuit control means for said clutches including a switch member operable by movement of a record card along said passage and adapted for deenergizing and releasing the said first clutch while concurrently energizing and effecting engagement of the second clutch and modify thereby further operation of both said feeding means to a reduced speed, and wherein said switch member is mounted for slidable adjustment along said passage to a plurality of selective positions relative to the said sensing station whereby said reduced speed operation is adapted to be effected at predetermined positions in the movement of a record card relative to the said sensing station.

18. The invention according to claim 17 and having a second circuit control means including a switch member operable by a movement of the record card along said passage and adapted for deenergizing and releasing the said second clutch while concurrently reenergizing the first clutch for reengagement to effect increased speed movement to the record feeding means, and wherein said second circuit control switch is mounted for slidable adjustment along said passage to a plurality of selective positions relative to the said sensing station whereby said increased speed operation is adapted to be effected to the record cards at predetermined positions thereof relative to the said sensing station.

19. In an apparatus for manifesting data contained in source records as data-representing designations and having means providing a record card feeding and sensing passage, a sensing station along said passage including a plurality of sensing members operable selectively each by a related row of data-representing designations moved past the sensing station during a record card feeding operation and adapted for pulsing related electrical circuits in accordance with said data-designations; in combination therewith devices adapted for confining such electrical pulsing operations to data designations as sensed during the movement of a predetermined portion of a record card past the sensing station and for reducing a card speed operation during said predetermined portion of movement thereof comprising a normally open relay switch in common circuit with all the said sensing members to prevent pulsing operations thereof, a first control switch having normally open contacts and including a capacitor in the circuit therewith, and wherein said control switch is operable by a leading edge of a record card to momentarily energize the said relay so as to activate the said common circuit, a plurality of circuit bars in parallel with the card passage, a support member for said switch slidably mounted upon said bars for adjustment to selective positions relative to the said sensing members, feeding means for entering record cards seriatim into said passage, feeding means for moving the record cards to the sensing station and being operable at faster speed to the said entering feed means whereby a leading card will be advanced from the trailing card to cause an open space to occur between each successive card, an electric motor, a first operating drive in train between said motor and both the said card feeding means including a first magnetic clutch said clutch being energized to engaged position upon initiation of an operation of said motor, a second operating drive said drive being in train with said first operating drive and including a normally deenergized magnetic clutch in disengaged position, and wherein the said second clutch is driven at reduced speed to the said first clutch, a relay switch having normally closed contacts in circuit with the first said clutch and normally open contacts in circuit with the second clutch, a control switch for said clutch relay having normally open contacts and including a capacitor in the circuit therewith, and wherein said switch is mounted with said first switch upon said support member for adjustment therewith to said selective positions, and wherein the latter named switch is adapted for operation by a leading edge of the record card for effecting momentary operation of said relay to release the said first clutch and to engage the said clutch whereby reduced card feed operation is effected substantially in time with said operation of the said first control switch by the record card, self-closing circuit means for holding each of said relays in energized condition, a normally engaged contact relay in circuit with both of said relays, a control circuit for said last named contact relay including a switch member having normally open contact members and a capacitor in said circuit, a support member for said last named switch said support member being slidably mounted upon said contact bars for adjustment to selective positions relative to the said sensing members and adapted for operation by a record card for effecting release of said self-closing circuit means to restore thereby the said pulsing circuit to inactive condition and to concurrently therewith effect a release of the reduced speed clutch while reengaging the first speed clutch for resuming a normal card speed movement.

20. The invention according to claim 19 and having a bridging circuit for each of said capacitors including a resistor element in each of said bridging circuits, contact elements engageable upon a release of said first control switch from the trailing edge of a record card and adapted to effect a discharging of the capacitor in the circuit related to said switch, contact elements adapted for engagement upon a release of the second control switch from the trailing edge of a record card to effect a discharging of the capacitor in the circuit associated with the said second control switch and contact elements adapted for engagement upon release of the third control switch from the record card to discharge the capacitor in the circuit related thereto.

21. In an apparatus of the class described; the combination, of means for sensing a record card having a plurality of columns each adapted to receive a data representing designation, means adapted for control by the sensing means upon sensing selected data columns of said card, control means for the said sensing means, said control means being operable by a preselected movement of a record card and adjustable to a plurality of positions whereby to selectively determine pairs of said data columns as the opposite terminal data columns defining any group of selected data columns to be actively sensed by the said sensing means during said preselected movement of a record card, and means settable with said adjustable control means to indicate the said terminal data columns selected.

22. In an apparatus of the class described; the combination, of means for sensing a record card having a plurality of columns of data representing designations, means adapted for control by the sensing means upon sensing said data columns, control devices for the sensing means said devices being operable in accordance with preselected movements of the record card and selectively adjustable at any time to any selected ones of a plurality of control positions relative to the said sensing means, and wherein a selective movement of the record card is adapted to control the sensing means thereby so as to effect a sensing of data columns selectively determined to be active in accordance with the said adjustment of said control means, a data column indicating scale, and means settable by the said selectively adjustable control devices whereby to indicate the position thereon with respect to the selecting of data columns on the card.

23. In an apparatus of the class described; the combination, of means for sensing a record card having a plurality of columns of data representing designations, control devices for said sensing means selectively settable to a plurality of predetermined positions, whereby to render the said sensing means effective relative to a sensing of any selected group of said data designations while a card is in motion, and including at least two control elements each one selectively adjustable independently of the other to a plurality of control positions with respect to the sensing means, and wherein said adjustments of said control elements selectively determines the opposite end columns of any data groups to be actively sensed, and to define thereby in accordance with a selective movement of the card any plurality of said data columns comprising the selected group to be sensed, and a means adjustable with the related one of each of said control elements whereby to indicate the respective adjustments thereof and thereby the selected data columns of the record card as active in a card movement.

24. In an apparatus of the class described; the combination, of means for sensing a moving record card having a plurality of columns of data representing designations, control means for said sensing means selectively adjustable in relation to a movement of the record card whereby to selectively determine the number of said data columns as operable by the record card in a group selectively determined thereby for active sensing in a record card movement, and including at least two manually operable members each one adapted for effecting an independent selective adjustment of said control means and wherein adjustment of one of said control members will determine a selected data column representing one terminal control column of a selected group, and adjustment of the other said control member will determine a selected data column representing an opposite terminal control column of said group, a data column indicating scale, and means settable with the related one of each of said control members for indicating on said scale the respective positions thereof.

25. In an apparatus of the class described; the combination, of means for sensing a record card in motion and having a plurality of columns each adapted to receive a data representing designation, circuit means controlled by said sensing means upon sensing of each column of said card, means adjustable to disable said sensing means with respect to selected columns of said card and operable by a selected movement of said card to control said circuit means, and means settable by said adjustable means to indicate said selected columns.

26. In an apparatus of the class described; the combination, of means for sensing a record card in motion and having a plurality of columns of data representing designations, circuit means adapted for a control by said sensing means whereby to effect an electrical impulse in accordance with a selective sensing of said columns of said card, means adjustable at any time to condition said circuit means relative to an operation thereof by the said sensing means with respect to selected columns of the card and thereby to selectively predetermine an active group of said data columns responsive to the said sensing means to control said circuit means, and means settable by said adjustable means to indicate said selected group.

27. In an apparatus of the class described; the combination, of means for sensing a record card in motion and having a plurality of columns each adapted to receive a data representing designation, circuit means adapted to be electrically impulsed by the said sensing means upon a sensing of said data columns during a movement of the record card, circuit control means selectively adjustable at any time relative to the sensing means whereby to selectively enable and disable said electrical impulsing by the said sensing means with respect to any selected columns of a card and means settable with said circuit control means to indicate said selected columns.

28. In an apparatus of the class described; the combination, of means for sensing record cards in motion and having a plurality of columns adapted to receive data representing designations, circuit means adapted to be electrically impulsed by the said sensing means in accordance with selected columns of data designations as actively sensed thereby during selective movements of said record cards, a first control means for said sensing impulse circuit, a second control means for said sensing impulse circuit, and wherein each of said control means is settable at any time relative to the other and to the sensing means, whereby to selectively determine at will different pluralities of data columns representing selectively determined groups operable during selective movements of the record cards in accordance with said setting, a scale for indicating said settings, and manually operable means for adjusting each of the said control means to the said settings in accordance therewith.

References Cited in the file of this patent
UNITED STATES PATENTS

| | | |
|---|---|---|
| 1,741,992 | Kleckler | Dec. 31, 1929 |
| 1,976,618 | Lee et al. | Oct. 9, 1934 |
| 2,084,850 | Lasker | June 22, 1937 |
| 2,374,790 | Terry | May 1, 1945 |
| 2,517,984 | Cunningham | Aug. 8, 1950 |
| 2,566,927 | Carroll et al. | Sept. 4, 1951 |
| 2,803,404 | Maul | Aug. 20, 1957 |

UNITED STATES PATENT OFFICE

CERTIFICATE OF CORRECTION

Patent No. 2,938,667                          May 31, 1960

Fritz A. Deutsch

It is hereby certified that error appears in the printed specification of the above numbered patent requiring correction and that the said Letters Patent should read as corrected below.

Column 1, line 17, for "machine" read -- machines --; line 27, for "succesive" read -- successive --; line 48, for "guided" read -- guide --; column 2, line 69, for "ablet" read -- able --; column 5, line 42, for "training" read -- trailing --; column 7, line 21, for "will" read -- well --; line 33, for "member" read -- members --; column 16, line 33, for "said clutch" read -- said second clutch --; column 18, line 51, for "settings" read -- setting --.

Signed and sealed this 22nd day of November 1960.

(SEAL)
Attest:

KARL H. AXLINE
Attesting Officer

ROBERT C. WATSON
Commissioner of Patents